(12) United States Patent
Mulligan et al.

(10) Patent No.: US 7,940,674 B2
(45) Date of Patent: *May 10, 2011

(54) METHOD OF COMMUNICATION BETWEEN REDUCED FUNCTIONALITY DEVICES IN AN IEEE 802.15.4 NETWORK

(75) Inventors: Geoff Mulligan, Colorado Springs, WI (US); Gregory A. Ehlers, New Port Richey, FL (US)

(73) Assignee: Ranco Incorporated of Delaware, Wilmington, DE (US)

( * ) Notice: Subject to any disclaimer, the term of this patent is extended or adjusted under 35 U.S.C. 154(b) by 177 days.

This patent is subject to a terminal disclaimer.

(21) Appl. No.: 12/251,526

(22) Filed: Oct. 15, 2008

(65) Prior Publication Data

US 2009/0040994 A1 Feb. 12, 2009

Related U.S. Application Data

(62) Division of application No. 11/254,382, filed on Oct. 19, 2005, now Pat. No. 7,486,631.

(60) Provisional application No. 60/621,180, filed on Oct. 20, 2004.

(51) Int. Cl.
*H04L 1/00* (2006.01)
(52) U.S. Cl. ......... 370/241; 370/244; 370/310; 370/339
(58) Field of Classification Search ........... 370/241–253
See application file for complete search history.

(56) References Cited

U.S. PATENT DOCUMENTS

2003/0151513 A1  8/2003  Herrmann et al.
2008/0037431 A1* 2/2008  Werb et al. .................... 370/241

OTHER PUBLICATIONS

"Part 15.4: Wireless Medium Access Control (MAC) and Physical Layer (PHY) specifications for low-Rate Wireless Personal Area Networks (LR-WPANs)", LAN/MAN Standards Committee of the IEEE Computer Society, p. i-viii, Chs: 1-7, IEEE STD 802.15.4TM-2003, Oct. 1, 2003, pp. 1-187.

"Will IEEE 802.15.4 Make Ubiquitous Networking a Reality?: A Discussion On A Potential Low Power, Low Bit Rate Standard", Zheng et al., IEEE Communications Magazine, vol. 42, No. 6, Jun. 2004, pp. 140-156.

"A Multi-Hop Implicit Routing Protocol For Sensor Networks", Hung-Huan Liu et al., 0-7803-8521, 2004 IEEE, pp. 2946-2950.

* cited by examiner

Primary Examiner — Seema S Rao
Assistant Examiner — Wanda Z Russell
(74) Attorney, Agent, or Firm — Howard & Howard Attorneys PLLC

(57) ABSTRACT

In a 802.15.4 network, each reduced functionality device (RFD) is permitted to communicate with only an assigned full function device (FFD). The present invention allows each of the RFDs to communicate with another RFD upon the RFD determining that the local FFD assigned to the RFD is inoperable or unable to communicate. Under emergency conditions, the RFD is able to communicate with a closely located RFDs such that the closely located RFDs can receive and respond to an emergency situation and/or repeat the message. To satisfy the 802.15.4 standards, communication between the RFDs is allowed only during emergency conditions and when the FFD is inoperative. A comprehensive test procedure is included to insure the integrity of the system is preserved at all times.

18 Claims, 5 Drawing Sheets

METHOD OF COMMUNICATION BETWEEN REDUCED FUNCTIONALITY DEVICES IN AN IEEE 802.15.4 NETWORK

CROSS REFERENCE TO RELATED APPLICATION

This application is a divisional application of application Ser. No. 11/254,382 filed on Oct. 19, 2005, now U.S. Pat. No. 7,486,631, which issued on Feb. 3, 2009, which is based on and claims priority from provisional patent application Ser. No. 60/621,180 filed on Oct. 20, 2004.

BACKGROUND OF THE INVENTION

IEEE standard 802.15.4 was developed to standardize communication between devices operating within a local area network (LAN). The IEEE standard was targeted at home, building and industrial automation and controls, consumer electronics, PC profiles and medical monitoring. The standards define the interoperability, certification testing and branding of devices that operate within the IEEE standard.

In a standard 802.15.4 network, the network includes three different device types. The first device type is classified as a network coordinator and maintains overall network knowledge.

The second type of device type in a 802.15.4 network is referred as a full function device (FFD). Each of the FFDs has full communication functionality with all the features required by the 802.15.4 standard. Further, the FFD includes additional memory and computing power that makes it ideal for acting as a network router. Each of the FFDs is able to communicate with both the network coordinator and lower level devices referred to as reduced function devices (RFDs).

The third type of device included in the 802.15.4 network is a reduced function device (RFD) that is designed to communicate with a single FFD. Each RFD includes limited functionality as specified by the 802.15.4 standard to limit the cost and complexity of the RFD. As required by the literal interpretation 802.15.4 standard, each RFD communicates solely with an FFD and cannot communicate with other RFDs.

The 802.15.4 network is contemplated as being particularly desirable in transmitting information within a building automation system. For example, each of the RFDs could be an environmental sensor, smoke detector, motion detector or any other kind of monitoring equipment that is required for monitoring and controlling the operation of a building.

Although the 802.15.4 networking configuration has worked well, a problem can occur if and when a FFD is rendered inoperative or is out of communications, such as during a power interruption. FFDs are generally designed to be online at all times and therefore are normally line powered. RFDs, by design, are not always online and typically are battery powered. When one of the FFDs is removed from the network, such as during the power loss to the FFD, the RFDs associated with the disabled FFD are unable to communicate information across the network unless they are within communication range of another FFD. If most or all of the FFDs are removed from the network (as might be the case during a power outage), then all of the RFDs will be unable to communicate a detected alarm condition. This drawback can become important when the RFDs are safety devices, such as smoke detectors.

Therefore, a need exists for an improved communication method operating within the 802.15.4 standard or any extension thereof, that allows for communication during emergency situations or when one or more of the FFDs has been rendered inoperative.

SUMMARY OF THE INVENTION

The present invention relates to a method of enhancing the communication between reduced functionality devices (RFDs) and full functional devices (FFDs) in a communication network, such as a network operated under the IEEE 802.15.4 standard. The method of the invention enhances communications particularly when one of the FFDs in the network has been rendered inoperative, such as during a power failure.

A standard network configured using IEEE standard 802.15.4 includes a plurality of RFDs that each include a wireless transceiver. Each of the RFDs is positioned such that the RFD is in communication range with an assigned FFD. In a typical 802.15.4 network, each of the RFDs communicates directly to its assigned FFD and responds only to messages received from the assigned FFD.

In accordance with the present invention, each of the RFDs is activated during a predetermined activation period. During the activation period, the RFD attempts to establish communication with the FFD to which it is assigned. If the RFD is unsuccessful in establishing communication with the FFD, the RFD enters into an "orphaned" state. The RFD enters into the orphaned state only upon the failure to establish communication with the assigned FFD.

After the RFD has entered into the orphaned state, the wireless transceiver of the RFD optionally remains active to transmit any alarm message and receive any messages from other RFDs within communication range of the RFD. Although the continued activation of the wireless transceiver of the RFD drains the power of the battery contained within the RFD, the RFD remains active during what may be an emergency situation.

During the time that the RFD is in an orphaned state and the wireless transceiver remains active or up waking/activation, the RFD can receive messages from either other RFDs or FFDs other than the FFD to which the RFD is assigned. When the RFD is in the orphaned state and receives a message, the RFD is allowed to respond to or relay the message as required. For example, if the RFD is a hazardous condition detector and the message received is a "smoke detected" message from another hazardous condition detector, the RFD is allowed to generate an alarm signal.

In addition to the orphan state operating conditions above, an RFD while in the orphan state can transmit an orphan state indicator as it attempts to rejoin with its assigned FFD. The orphan state indicator will alert other RFDs and FFDs that might receive the signal that an RFD has been orphaned and is seeking to join the network through an alternative temporary path. As a result, if an RFD wakes up and initiates a communications session with its assigned FFD and in the process receives an orphan state indicator from a near by RFD, the RFD can enter a temporary relay mode state and communicate with both the orphaned RFD and its assigned FFD to complete a temporary communication path over which the orphaned RFD can communicate with an operational FFD.

In a like fashion, if an orphaned RFD detects other RFDs transmitting an orphan state indicator, the orphaned RFD can respond and intercommunicate with other RFDs in an attempt to form an alternate path back to an operational FFD. Once associated with an alternative FFD or upon being relayed through another RFD, the orphaned RFD will assume an "orphaned but connected state".

If an operational FFD can not be located, the orphaned RFDs will optionally remain in communications with one another. This "orphaned and relaying but not connected state", permits RFDs to relay status and conditional information among themselves until an operational FFD returns to the system.

When an RFD's primary FFD is lost and subsequently returns to the network, the RFDs assigned to the FFD will drop any temporary alternative communication path that may have been established in the orphan mode with alternative FFDs and rejoin the primary FFD. The RFDs in this case, however, will not automatically drop any relay relationships they may have developed with other RFDs until those RFDs drop their relay relationships with them. This will only occur when the "relay dependent" RFDs primary FFD or an alternative non-primary FFD communications path is established. At this point, the "relay dependent" RFD will no longer need to depend on the RFD that is linked to its FFD for relay services and the relaying RFD can return to its normal mode as a standard operational RFD with an assigned primary FFD relationship.

In accordance with the present invention, an RFD will always attempt first to communicate with its primary FFD. If the communication is unsuccessful, the RFD will next attempt to join a non-primary FFD as an orphaned RFD until its primary FFD returns. The next level of recovery for an orphaned RFD can be to join with an RFD that has a communications path operational with either a primary or non-primary FFD in an orphaned but connected mode. In this case, the RFD will join with another RFD, which will relay its information to an FFD that is operational but not the primary FFD. Lastly, an orphaned RFD can form a relationship with other orphaned RFDs that have no linkage to an active FFD in the network to permit intercommunications in an "orphaned and relaying but not connected" mode.

In addition to responding to a received alarm message in an orphaned state, upon receiving the alarm signal, the orphaned RFD will remain active and retransmit the alarm message to other RFDs or non-primary FFDs within wireless communication range. The communication directly between the RFDs allows the RFDs to respond to an emergency condition even if the assigned FFD or any alternates have been rendered inoperative, such as through the interruption of power to the FFD.

While the RFD is in its orphaned state, the RFD continues to attempt to establish communication with its assigned FFD. Once the RFD establishes communication with its assigned FFD, the RFD exits the orphaned state and is then restricted from directly responding to any messages received from other RFDs, except as noted when other orphaned RFDs are dependent on it in a "relay state". When the RFD is no longer in the orphan state or the "relay state", the RFD will return to the "sleep" state and can respond only to messages from the assigned FFD, in accordance with the IEEE 802.15.4 standard.

During operation of the communication network, an FFD can carry out a test procedure on regularly schedule intervals. During the test procedure, the FFD causes each individual RFD to generate a test signal. After the test signal has been generated by the transmitting RFD, the other RFDs in the communication network act as signal receivers to receive and detect the test signal. Each of the receiving RFDs provide input to the FFD conducting the test on whether the test signal has been received and the quality of the signal. This test procedure is repeated for each RFD individually.

If during this test process, when an RFD transmits its test signal no other RFD receives the signal, the assigned FFD generates an alarm condition indicating that the transmitting RFD is unable to communicate with at least one other RFD. Such a situation may occur when the battery within the RFD is weak or if something in the communication path is blocking the signal generated by the transmitting RFD making it orphaned with no alternative route when the FFD is not available. The test procedure assures that each RFD is in communication range with at least one other RFD so that should the FFD fail, the RFD can still communicate an emergency message to another RFD. It is important to note that in a FFD failure state, each RFD should not only be capable of communicating with another RFD, but there should be a clear path over which all RFD can be interconnected. This assumes that in a network of more than two RFD's, an RFD that can only communicate with one other RFD must rely on that RFD to relay data to other RFDs. As a result, the relaying RFD in this case should be capable of communicating with at least one other RFD and so on until a complete interconnection of RFDs is accomplished.

BRIEF DESCRIPTION OF THE DRAWINGS

The drawings illustrate the best mode presently contemplated in carrying out the invention. In the drawings.

DETAILED DESCRIPTION OF THE PREFERRED EMBODIMENT

Figure 1:
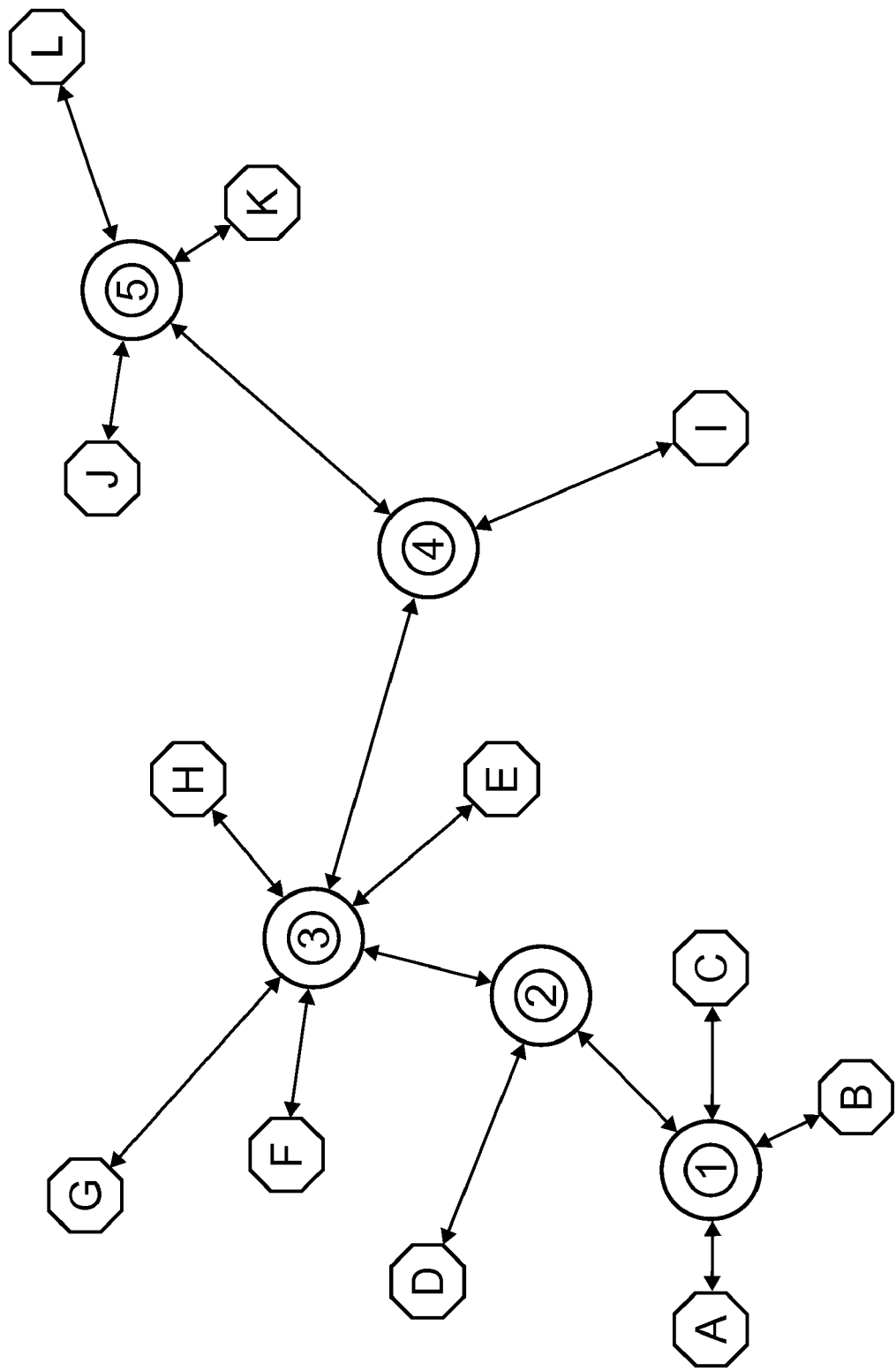
FIG. 1 is a schematic illustration of a standard IEEE 802.15.4 network in which the reduced functionality devices (RFDs) are shown by reference numbers A-L and the full function devices (FFDs) are labeled with reference numerals 1-5.

As illustrated in FIG. 1, the RFDs are shown by reference letters A-L. In the embodiment illustrated, each of the RFDs communicates to a single, full function device (FFD). Each of the FFDs shown in FIG. 1 is labeled with the reference numerals 1-5. In the example configuration of FIG. 1, the RFDs A, B and C are assigned to FFD 1 and are able to communicate only to the FFD 1. The FFD 1 is able to communicate to a second FFD 2.

In the standard embodiment of an 802.15.4 network, as shown in FIG. 1, should the RFD A need to transmit information to the RFD B, then RFD A transmits data first to the to FFD 1 and FFD 1 in turn transmits/forwards the message to RFD B. This multi-node communication is required, since both of the RFDs A and B are typically in an off, sleeping mode and are awake to accept messages only on an intermittent basis to conserve battery life. Thus, even if the RFD B was within the RF transmission range of the RFD A, the RFD A is unsure as to when the RFD B will be awake and able to receive a message. However, FFD 1 is active at all times and is aware of the schedule of the associated RFDs A, B and C such that the FFD 1 is able to transmit the received information from the RFD A to the RFD B.

As can be understood by the above description, the limited communication ability between the RFDs within the 802.15.4 network of FIG. 1 imposes a severe constraint on the network communication and design. Further, the restricted communication results in the requirement that each of the FFDs include some type of battery backup for cases where there may be a power outage. The battery backup ensures that the network continues to operate properly and can communicate messages throughout the network should a power outage occur. For example, if each of the RFDs A, B and C are hazardous condition detectors, such as smoke detectors, carbon monoxide detectors or combination units, if the power is disrupted to the FFD 1, it may be important for the RFDs A, B and C to be able to communicate with each other should one of the RFDs detect an alarm condition. If the FFD 1 is inactive and unable to communicate the alarm signals between the RFDs A, B and C, an alarm condition in one room of a home may not be relayed to an alarm device in another room.

In order to address the above identified problem, it is necessary to loosely interpret the 802.15.4 standard to allow each of the RFDs to accept messages from other devices besides their assigned FFDs during a narrowly defined condition. As an example, the RFDs A, B and C will be configured to accept messages from each other and alternate FFDs when the primary FFD is not available. In order to satisfy the 802.15.4 standard, the present invention will allow the RFDs to accept messages from devices other than the assigned FFD only under well constrained circumstances and in specifically defined situations, the details of which follow.

Figure 2:
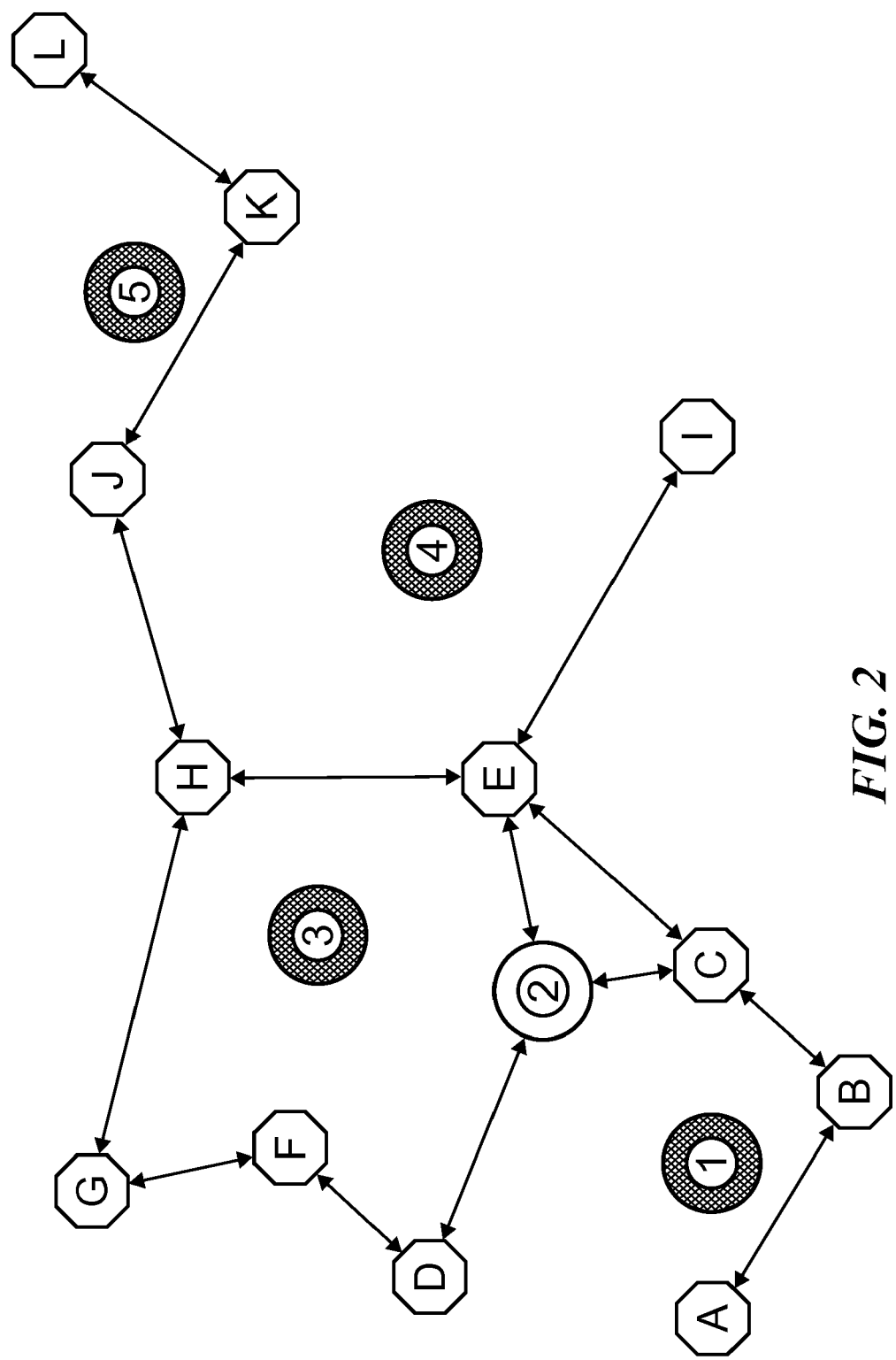
FIG. 2 is a schematic illustration of an 802.15.4 network in which the RFDs are allowed to communicate with each other and at least one alternate FFDs upon a communication failure to the FFD primarily assigned to the RFDs.

Referring now to FIG. 2, in accordance with the present invention, after one of the RFDs (A-L) has failed to communicate with its assigned FFD (1-5), and therefore has transitioned to an "orphaned state" as defined by the 802.15.4 standard, the RFD can remain active and then would be able to accept messages from devices other than the assigned FFD. During this extended emergency receiving time, if the RFD receives a broadcast message, the RFD will accept the message and process the message. As an example, if the RFD A is a hazardous condition detector, such as a smoke detector located within a building, the RFD A will, upon the detection of smoke, transmit an alarm signal to its associated FFD 1. During normal operation, the FFD 1 would then relay this message to the other RFDs B and C.

If the communication link between RFD A and FFD 1 is broken, as shown in FIG. 2, the RFD A enters an "orphaned" state and will continue to transmit the message, which may be received by the RFDs B and C. When the RFDs B and C awaken, the RFDs B and C will first attempt to communicate to the FFD 1. Once the RFDs B and C determine that FFD 1 is unavailable, the RFDs B and C will be allowed to receive messages from any transmitting RFD, such as RFD A, and process it. For example, if the RFD A is transmitting a "smoke detected" message, RFD B will receive this message directly from the RFD A and relay the message to RFD C, resulting in all three RFDs generating an audible alarm. Thus, the RFDs operating in accordance with the present invention will respond to a detected emergency in a situation that would not have otherwise generated the desired response in accordance with operation under the 802.15.4 standard.

Figure 4:
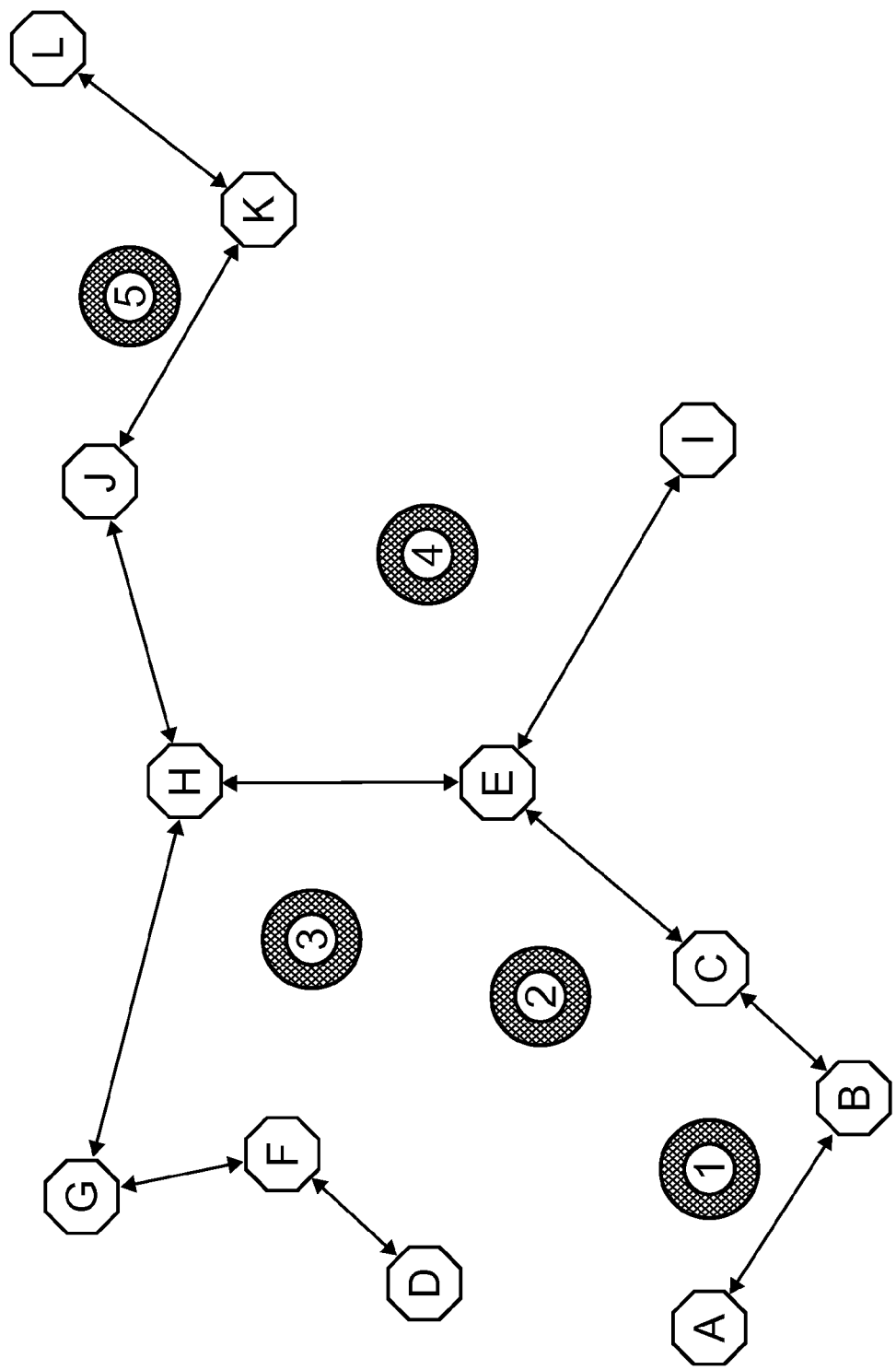
FIG. 4 is a schematic illustration of an 802.15.4 network in which each of the FFDs has been rendered inoperative.

In addition, upon receipt of the emergency message, both of the RFDs B and C will broadcast the message to any other devices within RF range. As shown in FIG. 2, FFD 2 will receive and respond to the message from the RFD C, passing the message on to other RFDs in the network. In FIG. 4 where all of the FFDs are disabled, RFD C will communicate directly with RFD E which will relay the message to other orphaned but linked RFDs, propagating the alarm signal. To be clear, the messages are not unicast to each of the other RFDs in the network, but instead are broadcast and therefore "flood" across the network.

It is anticipated that the alternate transmission mechanism of the present invention will be used only during emergency situations. The RFDs, which would normally be sleeping or only transmitting on a very infrequent basis, will continue to transmit broadcast packets constantly until the emergency situation is resolved or the device is shutdown.

Although it is understood that the transmission mechanism of the present invention will have a negative impact on the battery life of the RFDs (FIG. 4), battery life is a secondary consideration during an emergency situation. It is much more desirable that the RFD detecting the emergency situation will continue to transmit the message at the expense of battery life as needed to ensure the safety of all premise occupants.

The result of the alternative communication configuration of the present invention is that even during a power outage affecting the FFDs (FIG. 4), the battery powered RFDs will be able to communicate important/critical/emergency information throughout the network.

As discussed in detail above, the devices in the 802.15.4 network are allowed to "break" the 802.15.4 standard only under well constrained and limited situations. Specifically, each of the RFDs is allowed to communicate with a device other than its assigned FFD only after it has transitioned to an "orphaned state" and generally only when the RFD receives a broadcast alarm message.

Figure 3:
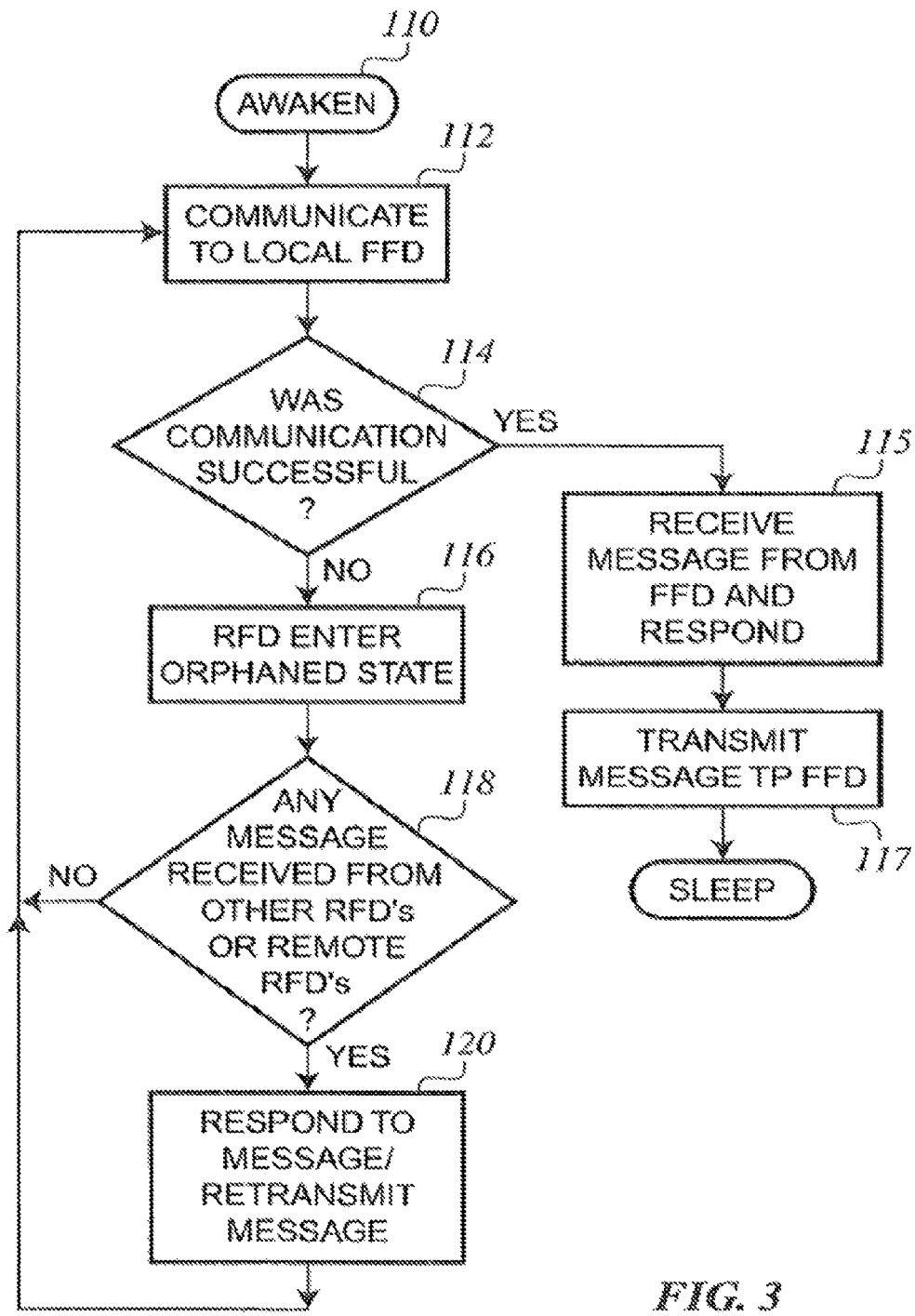
FIG. 3 is a flow chart illustrating the operation of each RFD within the 802.15.4 network.

Referring now to FIG. 3, when the RFD awakens at its normally scheduled interval, as shown by step 110, the RFD attempts to communicate with its assigned, local FFD as shown in step 112. If the RFD is able to communicate with its FFD, the RFD receives messages from the FFD and responds as desired, as shown in step 115. As an example, if the RFD receives an alarm message from the local FFD, the RFD will generate its local alarm as required. In addition to receiving messages from the FFD, the RFD also transmits information and messages to the FFD in step 117. As an example, if the RFD is detecting smoke, the RFD will send this message to the FFD so that the FFD can relay the signal to other devices in the network.

If the communication between the RFD and its local FFD fails in step 114, the RFD enters into an orphaned state, as shown in step 116. Although the 802.15.4 standard contemplates each of the RFDs entering into an orphaned state upon the failure to communicate with the local FFD, in accordance with the present invention, when the RFD is in the orphaned state, the RFD listens to determine whether any messages are received from other RFDs or remote FFDs, as illustrated in step 118. The messages received from the other RFDs or remote FFDs may be alarm conditions or other messages being transmitted by the remote devices.

As illustrated by step 120, if the RFD detects any message from another RFD or a remote FFD, the RFD is permitted to process and react to the message as required. For example, if each of the RFDs are smoke detectors, the RFD may receive a smoke alarm signal from one of the other RFDs and can then activate the alarm within the RFD. In addition, the RFD is allowed to retransmit the message, thereby passing the message to other RFDs or FFDs in wireless communication range with the RFD.

After responding to the message or retransmitting the message, the RFD again attempts to communicate with the local FFD in step 112. Once the RFD is able to communication with its local, assigned FFD, the RFD will exit the orphaned state and thus be prevented from responding to messages from other devices other than its assigned, local FFD, as required by the 802.15.4 standards.

It is preferred that under the 802.15.4 standard an FFD maintain Communications Quality of Service (CQOS) statistics for their associated RFD's. This is done to ensure that any RFD is not entering the orphan state as a result of poor signal quality following its initial installation or any time thereafter. When the signal quality between the FFD and an RFD is marginal or the FFD detects a diminished CQOS at any time, an alert is generated by the FFD of a type and in a manner to maintain an acceptable level of integrity of the system. This feature ensures the communications network between devices is maintained at the highest levels and that a battery powered RFD only functions in the orphan mode during true emergencies.

Figure 5:
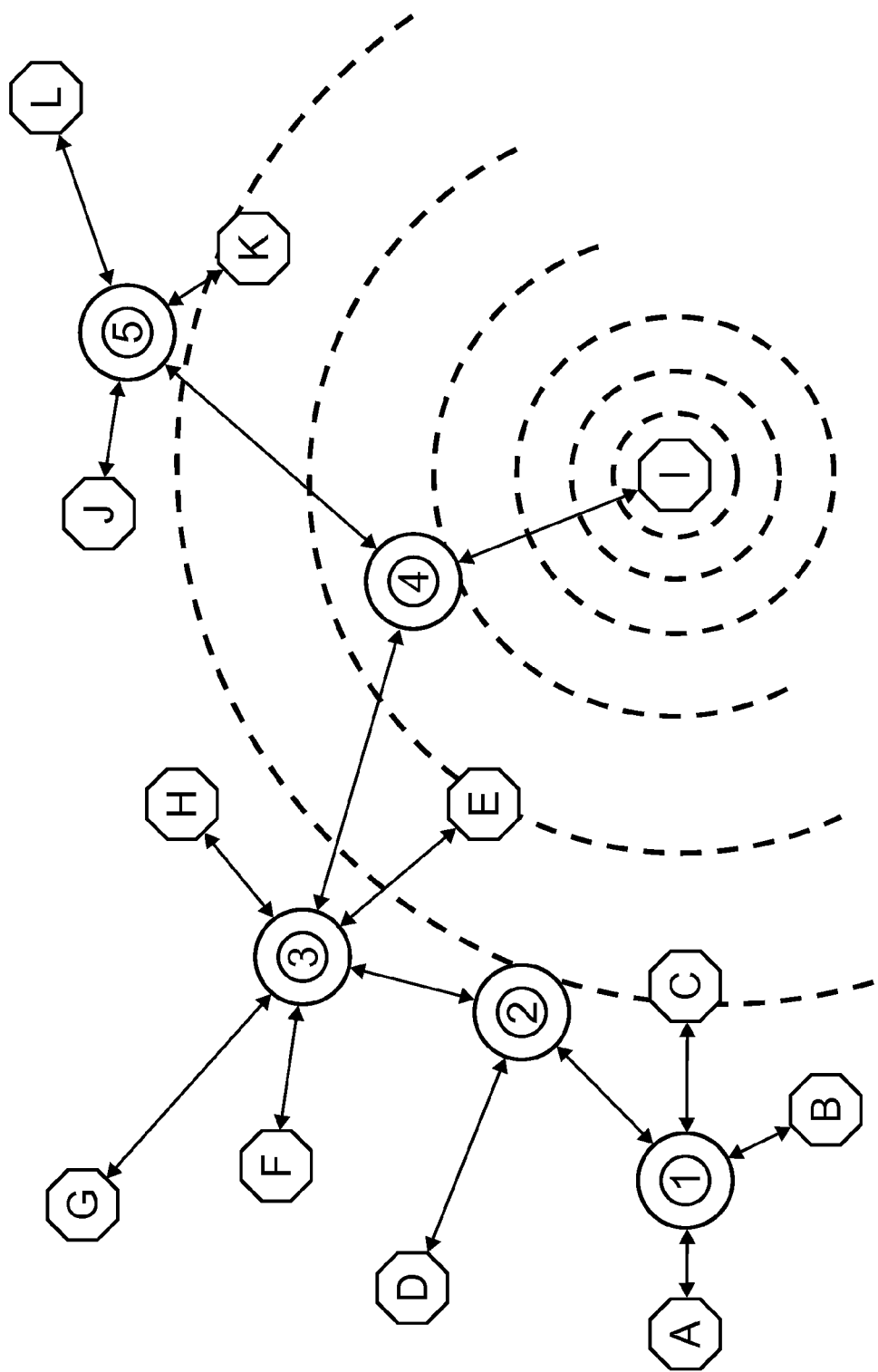
FIG. 5 is a schematic illustration of a test message generated by one of the RFDs and received by multiple other RFDs and FFDs.

In addition, to ensure that an RFD is able to intercommunicate with other RFDs during an emergency or when their assigned FFD is unavailable, a test sequence initiate by the FFD is part of the preferred implementation. This optional test procedure is integrated into the FFD on a scheduled and/or on demand basis. The test procedure causes the FFD to cause each of the RFD's to stay online during the test process. During the test procedure, the FFD causes each of the individual RFDs to transmit a test message as is illustrated in FIG. 5. In this illustration, FFD 4 has instructed all RFDs and other FFDs that it is conducting a test of the network. The FFD4 then requests that RFD I initiate a test transmission, which is detected in the illustration by RFDs C, E & K as well as FFDs 4 & 2. After the test signal has been generated by the first, transmitting RFD, the other RFDs in the communication network act as signal receivers to receive and detect the test signal. Each of the receiving RFDs and FFDs notify the FFD conducting the test that they have received the test signal along with any other data that may be needed by the FFD. The FFD optionally records this information into a non-volatile storage location. The test results from each RFD's test message may also be sent to the sending RFD where it may be stored for future reference in emergency situations. This test procedure is repeated for each of the RFDs individually.

If no other RFD in the group detects the transmission, the FFD can generate an alarm condition indicating that the transmitting RFD is unable to communicate with at least one other RFD. This procedure is essential in installations that are required to maintain a robust and reliable network under all conditions. The failure for one of the RFDs to communicate with at least one other RFD or FFD can occur when the battery of the RFD has been depleted or some obstruction or other factor is corrupting the communication pathway. In any of these cases, the signal generated by the transmitting RFD can no longer be received by one of the other RFDs or FFDs in the network. The test procedure ensures that each RFD is in communication range with at least one other RFD so that should all FFDs fail, the RFDs can still communicate an emergency message to one another. This test procedure insures that under emergency conditions, the integrity of the network will be preserved.

If no other RFD in the group detects the transmission, the FFD generates an alarm condition indicating that the transmitting RFD is unable to communicate with at least one other RFD. This procedure is essential in all installations to maintain a robust and reliable network under all conditions. The failure for one of the RFDs to communicate with at least one other RFD can occur when the battery within either of the RFDs has been depleted or if some other parameter in the communication pathway has changed such that the signal generated by the transmitting RFD can no longer be received or one of the other RFDs in the network. The test procedure ensures that each RFD is in communication range with at least one other RFD so that should the FFD fail, the RFD can still communicate an emergency message to another RFD. This test procedure insures that under emergency conditions, the integrity of the network will be preserved.

It is important to note that in a FFD failure state (FIG. 4), each RFD must not only be capable of communicating with another RFD, but there must be a clear path over which all RFDs can be interconnected. This assumes that in a network of more than two RFDs, an RFD that can only communicate with one other RFD must rely on that RFD to relay data to other RFDs. As a result, the relaying RDF in this case must be capable of communicating with at least one other RFD and so on until a complete interconnection of RFD's is accomplished

What is claimed is:

1. A method of operating a communication network including a full functional device (FFD) having a wireless transceiver and a plurality of reduced function devices (RFDs) each having a wireless transceiver and assigned to the FFD, the method comprising the steps of:
    positioning the RFDs such that each RFD is in communication range with the FFD and at least one other RFD;
    activating the FFD to perform a test procedure during which the FFD causes each of the RFDs to transmit a test message and each other RFD confirms receipt of the test message to the FFD;
    activating an alarm when the test signal from any RFD is not received by any of the other RFDs;
    allowing an orphaned RFD to communicate with another RFD when the orphaned RFD cannot communicate with its associated FFD.

2. The method of claim 1 wherein the communication network is operated under IEEE standard 802.15.4.

3. The method of claim 1 wherein the identity of each RFD and FFD receiving the test message from the RFD transmitting the test message is stored in the memory of the FFD conducting the test.

4. The method of claim 1 wherein the identity of each RFD and FFD receiving the test message from the RFD transmitting the test message is stored in the memory of the RFD sending the test message.

5. The method of claim 4 where the data stored in memory contains signal strength data associated with RFD and FFD reporting.

6. The method of claim 1 wherein each RFD is a hazardous condition detector including an internal battery.

7. The method of claim 1 wherein the wireless transceiver of each RFD is activated during a predetermined activation period, wherein the RFD attempts to establish communication to the FFD during the activation period, and wherein the step of allowing an orphaned RFD to communicate with another RFD, includes the steps of:
    determining whether communication has been established between the RFD and the FFD, wherein the RFD enters an orphaned state upon the failure to establish communication with the FFD;
    continuing to operate the transceiver of the RFD to receive messages from either the FFD or other RFDs when the RFD is in the orphaned state; and
    allowing the RFD to respond to the messages received from the other RFDs only when the RFD is in the orphaned state.

8. A method of operating a communication network, comprising the steps of:

(a) providing a full functional device (FFD) having a transceiver operable to receive and send messages using radio frequency;
(b) providing a plurality of reduced functionality devices (RFDs) each having a transceiver operable to receive and transmit messages using radio frequency;
(c) positioning the RFDs such that each RFD is in communication range with the FFD and at least one other RFD;
(d) initiating a test procedure and causing the RFDs to stay online during the test procedure;
(e) activating the FFD and sending a message by the FFD to the RFDs that a test is being conducted;
(f) sending a request, by the FFD, to one of the RFDs to initiate a test transmission;
(g) sending a confirmation signal to the FFD by each other RFD which receives the test transmission;
(h) receiving the confirmation signals by the FFD; and
(i) activating an alarm when the test signal from the one RFD is not received by one of the other RFD's; and,
allowing an orphaned RFD to communicate with another RFD when the orphaned RFD cannot with an associated FFD.

9. A method, as set forth in claim 8, including the step of performing the test procedure on a scheduled or on demand basis.

10. A method, as set forth in claim 8, including the steps of performing steps (f) through (i) for each other RFD in turn.

11. A method, as set forth in claim 8, including the step of storing the confirmation signals at the FFD as test results.

12. A method, as set forth in claim 11, including the steps of sending the test results to the one RFD and storing the tests results thereon.

13. A method, as set forth in claim 8, wherein the alarm is activated when no other RFD receives the test signal.

14. The method of claim 8, wherein the communication network is operated under IEEE standard 802.15.4.

15. The method of claim 8, wherein the identity of each RFD and FFD receiving the test message from the RFD transmitting the test message is stored in the memory of the FFD conducting the test.

16. The method of claim 8, wherein the identity of each RFD and FFD receiving the test message from the RFD transmitting the test message is stored in the memory of the RFD sending the test message.

17. The method of claim 16, where the data stored in memory contains signal strength data associated with RFD and FFD reporting.

18. The method of claim 8, wherein each RFD is a hazardous condition detector including an internal battery.

\* \* \* \* \*